Sept. 25, 1962 F. S. HARRIS 3,056,127

TRANSMIT-RECEIVE SYSTEM

Filed July 21, 1959

*INVENTOR.*

FRANCIS SAMUEL HARRIS

*BY* Alfred H. Rosen

ATTORNEY

United States Patent Office 3,056,127 Patented Sept. 25, 1962

3,056,127
TRANSMIT-RECEIVE SYSTEM

Francis Samuel Harris, Medfield, Mass., assignor to Microwave Associates, Inc., Burlington, Mass., a corporation of Massachusetts Filed July 21, 1959, Ser. No. 828,652
19 Claims. (Cl. 343—5)

This invention relates in general to radio transmit-receive systems, and more particularly to the protection of the receiver input stages of such systems during transmission periods.

In presently known radio transmit-receive systems, radar systems included, the arrangements for receiver protection all have a common failing in that they present a loss in signal transmission to the receiver during periods when the system is receiving. Furthermore, as transmission periods become shorter the recovery time of the protective device becomes an appreciable part of the listening period, making it difficult to obtain "early return" information. In a radar system, this means that close-in targets will be difficult, if not impossible, to detect. The need for T-R switch, or receiver protective means which has faster recovery time, low noise, and is more nearly lossless is quite apparent.

It is an object of the present invention to provide T-R switch means which are noise-free to a greater extent than prior T-R switch means, and which cause smaller losses, and have faster recovery time than prior T-R switch means. It is another object of the invention to provide T-R switch means which, during receiving periods, is able to function as a preamplifier having high-gain and low-noise characteristics. Further objects are to provide the foregoing advantages in structures which are rugged and reliable, and which employ commercially available components.

In its more general aspects, the invention contemplates a radio transmit-receive system having a tunable circuit adjusted for resonance to a prescribed frequency, and a voltage-variable reactance device coupled with this circuit to control the resonance frequency thereof, in combination with means to apply a voltage to the voltage-variable reactance device to detune said circuit from said prescribed frequency.

In a more specific aspect, the invention contemplates employment of a tuned circuit which is able to function as a parametric amplifier, when for example a pump signal is applied to a voltage-variable reactance device coupled to the circuit, and as a substantially lossless transmitter of received energy which is brought to it when no pump energy is present. The application of a switching or control bias voltage to the voltage-variable reactance device in this case not only detunes the tuned circuit so that it no longer passes the received signal, but also effectively prevents pump energy (when present) from interacting with signal energy. Such an arrangement functions when the transmitter is operated to protect the receiver, and during the receiving period it functions to pass received energy to the receiver essentially without loss and, if provided with pump energy, it acts also as a low-noise high-gain amplifier for the received signal.

In another aspect, the invention, due to the employment of a voltage-variable reactance device, is able to exhibit extraordinarily fast recovery upon termination of the transmitting period, which is especially valuable when the invention is incorporated in a radar system for the detection of close-in targets. The foregoing and other objects, features and advantages of the invention will become apparent from the following description of certain embodiments thereof. This description refers to the accompanying drawing wherein.

Figure 1:
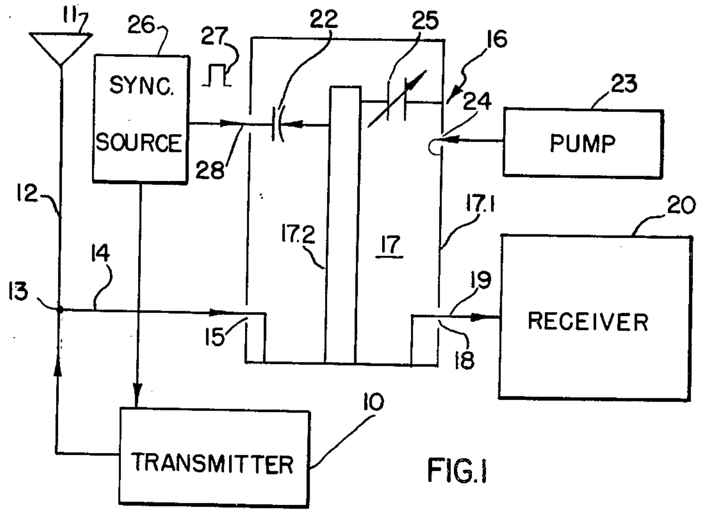
FIG. 1 illustrates the invention as applied to a radar system.

Referring now to FIG. 1, a transmitter 10, of the kind employed in radar systems, is coupled to a common transmit and receive antenna 11 by a transmission line 12. At a point 13 in this transmission line between the transmitter and the antenna, there is coupled to the transmission line one end of a receiver line 14, which runs to the signal input terminal 15 of a parametric amplifier generally indicated at 16. The amplifier 16 includes a coaxial cavity 17 comprising an outer conductor 17.1 and an inner conductor 17.2. A signal output terminal 18 is provided through the outer conductor 17.1 of the cavity, to which a further receiver line 19 connects the receiver 20 of the radar system. The parametric amplifier 16 is described in detail and claimed in my copending application Serial No. 785,384, filed January 7, 1959, and assigned to the same assignee as the present application. As is described in my copending application, a voltage-variable capacitance device 22 is coupled between the inner and outer conductors 17.2 and 17.1, respectively, and pump energy is supplied by a pump oscillator 23 via a pump energy input terminal 24 located in and through the outer conductor 17.1. A source of synchronizing pulses 26 controls the transmitter 10 and supplies a synchronized control pulse 27 to the voltage-variable reactance device 22 via a line 28 each time the transmitter is operated, for a purpose to be described below. A variable capacitor 25 connected between the inner and outer conductors 17.2 and 17.1, respectively, is used to tune the coaxial cavity 17 to a desired frequency band.

The operation and function of the amplifier 16 are fully described in my copending application. Briefly these are as follows. The coaxial cavity 17 is tuned via the capacitor 25 to the frequency band in the center of which the receiver signal will fall. This is done with the radar system in the "receive" condition. When so tuned, it is essentially a "tank" which, when inserted in the receiver input line 14, 19, acts as a band pass filter with little or no change in receiver sensitivity or noise figure. The introduction of pump power from the pump oscillator 23, in the presence of a suitable voltage bias on the voltage-variable capacitance device 22 (as will be more fully described in connection with FIG. 3), simply constitutes this filter a low noise amplifier of the receiver input signal. Thus, for example, if the receiver operates at a frequency of 500 mc./sec., the tank is resonated at the same frequency. Then a suitable pump frequency would be 2000 mc./sec., for example.

Figure 3:
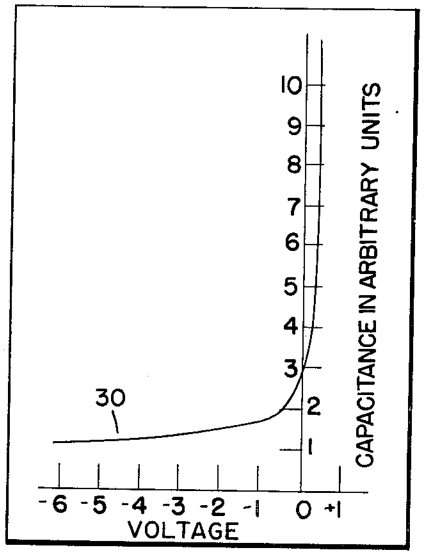
FIG. 3 illustrates the voltage-variable capacitance characteristics of certain solid state devices.

FIG. 3 illustrates in arbitrary units the small signal capacitance of a voltage-variable capacitance semiconductor diode (e.g., silicon) as a function of voltage applied across it. Typical of this kind of diode is a PN junction diode which has a nonlinear charge voltage characteristic and is designed to minimize high-frequency loss. Such diodes are known in the art, sometimes by the name "mesa" diode, sometimes as a "Varactor." The capacitance vs. voltage variation shown in FIG. 3 is typical of graded PN junctions produced by solid-state diffusion. When provided with a small voltage bias across the junction, these diodes undergo a small change in capacitance in the presence of small signals as is apparent from the capacitance vs. voltage curve 30 in FIG. 3; this change in capacitance is appropriate for use in a parametric amplifier. However, if a positive bias of a few tenths of a volt is applied across the junction, not only does the capacitance of the diode undergo a vast change, but even a small signal superimposed on the bias causes a wide swing in the magnitude of the capacitance. Such a large change in capacitance of the diode 12 radically shifts the frequency band to which the cavity 17 is tuned. This characteristic is taken advantage of in the present invention.

Referring again to FIG. 1, the control pulse 27 from the synchronizing source 26 is a voltage pulse of sufficient magnitude (+0.5 volt, for example) in the positive direction to cause a vast increase in the capacitance of the voltage-variable capacitance diode 12. The cavity or "tank" 17 is, however, as mentioned above, resonated to the receiver frequency with the system in the "receive" condition, that is, with the diode 12 biased (for example, at 0 or 0.1 volt, or at −0.1 volt) so that the change in capacitance of the diode 12 caused by the control pulse 27 detunes the cavity (i.e., tunes the cavity to some frequency band which does not include the receiver signal frequency). In the detuned condition of the cavity, energy at the receiver frequency entering the receiver line 14 from the transmission line 12 is reflected—it cannot reach the receiver through the detuned cavity. The length of the receiver line 14 is preferably adjusted so that when the cavity is detuned (i.e., tuned to some frequency band which does not include the receiver signal frequency) it will present a high impedance at its junction 13 with the transmission line 12. In this detuned condition the cavity 17 not only fails to pass energy at the receiver frequency, but also fails to accept energy at the pump frequency, for as is explained in the above-mentioned copending application, the cavity 17 is simultaneously resonant to the signal, pump and idler frequencies when adjusted to function as a parametric amplifier. Thus, even if a small amount of transmitter energy (at the receiver frequency) gets into the detuned cavity, there will be little or no pump energy present to amplify it.

The system of FIG. 1 is thus a radar system having a transmit-receive switch means which on the one hand effectively isolates the receiver from the remainder of the system during transmit periods, and on the other hand not only passes received energy with no loss and very low noise during receive periods, but also functions as a preamplifier of superior low-noise high-gain characteristics. Furthermore, this transmit-receive switch arrangement has highly improved quick-recovery characteristics. The switching speed possible with voltage-variable capacitance diodes 12 of the kind known as "Varactor," for example, is extremely high, since the capacitance changes in these diodes follow changes in junction voltage within a small fraction of a millimicrosecond.

Figure 2:
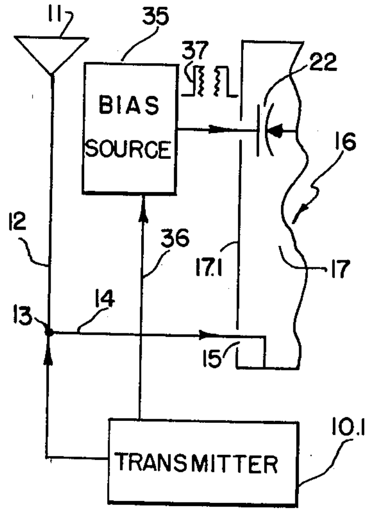
FIG. 2 illustrates the invention as applied to a transmit-receive communications system.

FIG. 2 is the same as FIG. 1, except for certain changes in construction which will be described below. Parts which are not changed bear the same reference characters as in FIG. 1, and many parts which are identical to parts in FIG. 1 have not been illustrated. Thus a portion of the amplifier 16, and a receiver 20 and pump 23 should be understood to be present in FIG. 2, arranged exactly as in FIG. 1. A bias source 35 in FIG. 2 replaces the synchronizing source 26 in FIG. 1. The bias source 35 is controlled by the transmitter 10.1 over a control line 36, so that when the transmitter 10.1 is operated, the bias source provides a bias voltage pulse 37 which is sufficiently positive in magnitude (like the pulse 27 in FIG. 1) to detune the cavity 17 with reference to the receiver frequency. However, since the system in FIG. 2 is a transmit-receive communication system, rather than a radar system, the operating period of the transmitter 10.1 can be longer than the operating period of the radar transmitter 10 of FIG. 1. Accordingly, while the bias pulse 27 in FIG. 1 is short, corresponding to pulse-operation of the radar transmitter 10, the duration of the bias pulse 37 in FIG. 2 is illustrated as variable, corresponding to the variable periods of operation of a communication transmitter. The principles applicable to the transmit-receive switching and amplifying functions of the amplifier 16 are, however, identical in FIGS. 1 and 2. Likewise, in FIG. 2, as well as in FIG. 1, the receiver line 14 is preferably adjusted in length to present a high impedance at its junction 13 with the main transmission line 12 when the transmitter is operated.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Radio signal translating system comprising; a parametric amplifier having tunable circuit adjusted for resonance to a prescribed frequency, a voltage-variable reactance device coupled with said circuit to control the resonance frequency thereof, signal input and signal output means coupled with said circuit, and means to apply pump energy to said device; and means to apply a voltage to said device to detune said circuit from said prescribed frequency.

2. In a radio transmit-receive system, in combination: a parametric amplifier comprising a tunable circuit adjusted for resonance to a prescribed frequency, a signal input terminal, a signal output terminal, a voltage-variable reactance device in said circuit, and means to apply pump energy thereto; said voltage-variable reactance device being coupled with said circuit in a manner to control the resonance frequency thereof; and means to apply a voltage to said device to detune said circuit from said prescribed frequency.

3. In a radio transmit-receive system, in combination: a parametric amplifier comprising a tunable circuit adjusted for resonance to a prescribed frequency, a signal input terminal, a signal output terminal, a voltage-variable reactance device in said circuit, and means to apply pump energy thereto; said voltage-variable reactance device being coupled with said circuit in a manner to control the resonance frequency thereof; an antenna coupled to said signal input terminal and a receiver tunable to said frequency coupled at its input to said signal output terminal whereby signals at said prescribed frequency are coupled to said receiver input from said antenna via said amplifier when said circuit is resonant to said prescribed frequency; and means to apply a voltage to said device to detune said circuit from said prescribed frequency.

4. In a radio transmit-receive system, in combination: a parametric amplifier comprising a tunable circuit adjusted for resonance to a prescribed frequency, a signal input terminal, a signal output terminal, a voltage-variable reactance device in said circuit, and means to apply pump energy thereto; said voltage-variable reactance device being coupled with said circuit in a manner to control the resonance frequency thereof; a receiver tunable to said frequency coupled at its input to said signal output terminal; a transmitter; and means synchronized with said transmitter to apply a voltage to said device to detune said circuit from said prescribed frequency when said transmitter is operated.

5. In a radio transmit-receive system, in combination: a parametric amplifier comprising a tunable circuit adjusted for resonance to a prescribed frequency, a signal input terminal, a signal output terminal, a voltage-variable reactance device in said circuit, and means to apply pump energy thereto; said voltage-variable reactance device being coupled with said circuit in a manner to control the resonance frequency thereof; an antenna coupled to said signal input terminal and a receiver coupled at its input to said signal output terminal whereby signals at said prescribed frequency are coupled to said receiver input from said antenna via said amplifier when said circuit is resonant to said prescribed frequency; a transmitter; and means synchronized with said transmitter to apply a voltage to said device to detune said circuit from said prescribed frequency when said transmitter is operated.

6. In a radar system having a transmitter, a receiver and a common antenna, combined transmit-receive switch and receiver input amplifier means comprising: a parametric amplifier having a tunable circuit adjusted for resonance to the receiver input signal frequency, a signal input terminal, a signal output terminal, a voltage-variable reactance device in said circuit and means to apply pump energy thereto; said circuit being connected via said terminals between the receiver and the remainder of the radar system; said voltage-variable reactance device being coupled with said circuit in a manner to control the resonance frequency thereof; and means synchronized with said transmitter to apply a voltage to said device to detune said circuit from the receiver input signal frequency when said transmitter is operated.

7. In a radar system having a transmitter, a receiver, a common antenna, a first transmission line from said transmitter to said antenna and a branch transmission line from said first line to the input of said receiver, combined transmit-receive switch and receiver input amplifier means comprising: a parametric amplifier having a tunable circuit adjusted for resonance to the receiver input signal frequency, a signal input terminal, a signal output terminal, a voltage-variable reactance device in said circuit and means to apply pump energy thereto; said circuit being connected via said terminals in said branch transmission line between the receiver input and the remainder of the radar system; said voltage-variable reactance device being coupled with said circuit in a manner to control the resonance frequency thereof; and means synchronized with said transmitter to apply a voltage to said device to detune said circuit from the receiver input signal frequency when said transmitter is operated.

8. System according to claim 7 in which the electrical length of said branch transmission line between said first transmission line to said signal input terminal is adjusted so that when said circuit is detuned from said receiver input signal frequency said branch transmission line presents an increased impedance at its junction with said first transmission line.

9. Wave signal translating circuit comprising a signal transmission path adapted to pass a given signal substantially without reflection of signal energy, a voltage-variable reactance device coupled to said path in a manner to control the impedance thereof with respect to said signal, means to apply pump energy to said device to amplify said signal at the expense of said pump energy through variation of the reactance of said device at the pump energy frequency, and means to apply a voltage to said device to alter said impedance to both said signal and said pump energy, whereby to cause reflection of said signal energy.

10. Wave signal translating circuit comprising a signal transmission path, a voltage-variable reactance device coupled to said path in a manner to control the impedance thereof with respect to a given signal propagating therein, said path being adapted to pass said signal substantially without reflection of signal energy when said device is in a first reactance condition, means to apply pump energy to said device to vary the reactance thereof at the pump energy frequency and thereby amplify said signal energy at the expense of said pump energy, and means to apply a voltage to said device to place said device in a second reactance condition in which its reactance alters said impedance to an extent that substantially all of said energy is reflected in said path and substantially no pump energy is presented via said device to said path.

11. Radio transmit-receive system comprising a transmitter, a receiver, a wave signal transmission path coupled to the input of said receiver, a voltage-variable reactance device coupled to said path in a manner to control the impedance thereof with respect to a given signal propagating therein toward said receiver input, said path being adapted to pass said signal substantially without reflection of signal energy when said device is in a first condition having a first value of reactance, means to apply pump energy to said device to vary the reactance thereof at the pump energy frequency and thereby amplify said signal energy at the expense of said pump energy, and means synchronized with said transmitter to apply a voltage to said device to place said device in a second condition having a second value of reactance which alters said impedance to an extent that substantially all of said energy is reflected in said path and substantially no pump energy is presented via said device to said path when said transmitter is made operative.

12. Radio transmit-receive system comprising a transmitter, a receiver, a wave signal transmission path coupled to the input of said receiver, a voltage-variable capacitance semiconductor device coupled to said path in a manner to control the impedance thereof with respect to a given signal propagating therein toward said receiver input, said path being adapted to pass said signal substantially without reflection when said device is in a first condition having a first value of capacitance, means to apply pump energy to said device to vary the capacitance thereof at the pump energy frequency and thereby amplify said signal energy at the expense of said pump energy, and means synchronized with said transmitter to apply a voltage to said device to place said device in a second condition in which it has a second value of capacitance which alters said impedance to an extent that substantially all of said energy is reflected in said path and substantially no pump energy is presented via said device to said path when said transmitter is made operative.

13. In a radar system having a transmitter, a receiver and a common antenna, a wave signal transmission path coupled between the input of said receiver and the remainder of said radar system, a voltage-variable reactance device coupled to said path in a manner to control the impedance thereof with respect to a signal in the operating frequency band of said radar system propagating therein toward said receiver input, said path being adapted to pass said signal substantially without reflection when said device is in a first condition having a first value of reactance, means to apply pump energy to said device to vary the reactance thereof at the pump energy frequency and thereby amplify said signal energy at the expense of said pump energy, and means synchronized with said transmitter to apply a voltage to said device to place said device in a second condition in which it has a second value of reactance which alters said impedance to an extent that substantially all of said energy is reflected in said path and substantially no pump energy is presented via said device to said path when said transmitter is made operative.

14. In a radar system having a transmitter, a receiver, a common antenna, a main signal wave transmission path between said transmitter and said antenna, and a branch signal wave transmission path from said main path to the input of said receiver, a voltage-variable reactance device coupled to said branch path in a manner to control the impedance thereof with respect to a signal in the operating frequency band of said radar system propagating therein toward said receiver input, said branch path being adapted to pass said signal substantially without reflection when said device is in a first condition having a first value of reactance, means to apply pump energy to said device to vary the reactance thereof at the pump energy frequency and thereby amplify said signal energy at the expense of said pump energy, and means synchronized with said transmitter to apply a voltage to said device to place said device in a second condition in which it has a second value of reactance which alters said impedance to an extent that substantially all of said energy is reflected in said path and substantially no pump energy is presented via said device to said path when said transmitter is made operative.

15. System according to claim 14 in which the electrical length of said branch transmission path between said main path and the point in said branch path where said device is effective is adjusted so that when said device is in said second condition said branch path presents substantially open-circuit impedance to said signal as seen from the junction of said main and branch paths.

16. Wave signal translating circuit comprising a signal transmission path, a voltage-variable capacitance semiconductor device coupled across said path, said path being adapted to pass substantially without reflection signal energy at a given frequency propagating therein, means to apply pump energy to said device to vary the capacitance thereof at the pump energy frequency and thereby amplify said signal energy at the expense of said pump energy, and means to apply a voltage to said device to alter the capacitance thereof to an extent that substantially all of said energy is reflected in said path and substantially no pump energy is presented via said device to said path.

17. Radio transmit-receive system comprising a transmitter, a receiver, a wave signal transmission path coupled to the input of said receiver, a voltage-variable capacitance semiconductor device coupled across said path, said path being adapted to pass substantially without reflection signal energy at a given frequency propagating therein toward said receiver input, means to apply pump energy to said device to vary the capacitance thereof at the pump energy frequency and thereby amplify said signal energy at the expense of said pump energy, and means synchronized with said transmitter to apply a voltage to said device to alter the capacitance thereof to an extent that substantially all of said energy is reflected in said path and substantially no pump energy is presented via said device to said path when said transmitter is made operative.

18. In a radar system having a transmitter, a receiver, a common antenna, a main signal wave transmission path between said transmitter and said antenna, and a branch signal wave transmission path from said main path to the input of said receiver, a voltage-variable capacitance semiconductor device coupled across said path, said path being adapted to pass substantially without reflection a signal in the operating frequency band of said radar system propagating therein toward said receiver input, means to apply pump energy to said device to vary the capacitance thereof at the pump energy frequency and thereby amplify said signal energy at the expense of said pump energy, and means synchronized with said transmitter to apply a voltage to said device to alter the capacitance thereof to an extent that substantially all of said signal is reflected in said path and substantially no pump energy is presented via said device to said path when said transmitter is made operative.

19. Radio signal translating system comprising: a parametric amplifier having a tunable circuit adjusted for resonance to a prescribed frequency, a voltage-variable reactance device coupled with said circuit to control the resonance frequency thereof, signal input and signal output means coupled with said circuit, and means to apply pump energy to said device; said device being a semiconductor PN junction device exhibiting a nonlinear capacitance characteristic, means biasing said device for operation in a given region of said characteristic when said circuit is adjusted for said resonance, and means to apply a voltage to said device to shift the operation thereof to another region of said characteristic whereby to detune said circuit from said prescribed frequency.

References Cited in the file of this patent

UNITED STATES PATENTS

| | | |
|---|---|---|
| 2,549,639 | Rosencrans | Apr. 17, 1951 |
| 2,594,732 | Cork | Apr. 29, 1952 |
| 2,884,607 | Uhlir | Apr. 28, 1959 |
| 2,911,601 | Gunn et al. | Nov. 3, 1959 |
| 2,928,056 | Lampert | Mar. 8, 1960 |